United States Patent

Fremgen et al.

[11] Patent Number: 5,610,370
[45] Date of Patent: Mar. 11, 1997

[54] CLOSURE FOR CABLES

[75] Inventors: Dieter Fremgen, Wülfrath; Frank Vock, Dortmund, both of Germany

[73] Assignee: Raychem GmbH, Ottobrunn, Germany

[21] Appl. No.: 491,847

[22] PCT Filed: Jan. 6, 1994

[86] PCT No.: PCT/GB94/00024

§ 371 Date: Jun. 21, 1995

§ 102(e) Date: Jun. 21, 1995

[87] PCT Pub. No.: WO94/16476

PCT Pub. Date: Jul. 21, 1994

[30] Foreign Application Priority Data

Jan. 7, 1993 [DE] Germany .......................... 43 00 177.7
Jul. 8, 1993 [GB] United Kingdom ................... 9314160

[51] Int. Cl.⁶ .............................................. H02G 15/113
[52] U.S. Cl. .................... 174/91; 174/92; 174/93
[58] Field of Search ................... 174/91, 92, 93, 174/84 R, 87

[56] References Cited

U.S. PATENT DOCUMENTS 4,295,005  10/1981  Daugherty et al. ...................... 174/92
4,751,350   6/1988  Eaton ...................................... 174/87
4,752,653   6/1988  Bachel et al. ........................... 174/93
4,919,372   4/1990  Twist et al. ............................. 248/56
4,988,834   1/1991  Birch ....................................... 174/93
5,021,006   6/1991  Fargeaud et al. ..................... 439/469
5,124,507   6/1992  Dehling ................................... 174/92
5,162,772  11/1992  May ................................... 336/92 X

FOREIGN PATENT DOCUMENTS

0440903A1  11/1990  European Pat. Off. .
3511039A1  10/1986  Germany .
  2167614   5/1986  United Kingdom .
  2223132   3/1990  United Kingdom .

Primary Examiner—Kristine L. Kincaid
Assistant Examiner—Chau N. Nguyen
Attorney, Agent, or Firm—William D. Zahrt, II; Herbert G. Burkard

[57] ABSTRACT

A closure for a cable joint having a cable inlet having a cable gripper that can provide strain relief to a cable within the inlet, the cable gripper being adjustable to grip cables of different diameters in such a way that the position of the center line of a gripped cable is substantially independent of cable diameter.

9 Claims, 3 Drawing Sheets 5,610,370

CLOSURE FOR CABLES

BACKGROUND OF THE INVENTION

The invention relates to a closure for coaxial cables or the like in CATV or other wide-band communications networks, having a special cable gripper and preferably having a body that can form an environmental seal around cable inlets and cable outlets, and electronics such as a printed circuit board or other means mounted inside the sleeve body having branch circuit connections for splicing and/or splitting a CATV or other signal. The attenuation of the branch circuit connections can preferably be changed.

SUMMARY OF THE INVENTION

Thus, the invention provides a closure for a cable joint having a cable inlet having a cable gripper that can provide strain relief to a cable within the inlet, the cable gripper being adjustable to grip cables of different diameters n such a way that the position of the center line of a gripped cable is substantially independent of cable diameter.

The cable gripper preferably comprises at least two first sections and at least one second section, the first and second sections each having a cable gripping surface which is preferably convex and which surfaces together approximate to a cylinder within which the cable can be received, in which movement of the second section towards the first sections causes the first sections to move towards one another.

The first sections are preferably resiliently biased apart, and the second section preferably may be moved towards and away from the first sections by means of a screw-thread.

The second section may be pivoted relative to the first sections to split the cylinder preferably facilitating entry of a cable, for example transversely.

The closure of the invention preferably has a sealing material such as a gel, a mastic or an elastomer at the inlet, and preferably has a base and a cover, the cable gripper being provided in the base and the inlet being defined partly in the base and partly in the cover.

The closure is preferably a CATV splitter box and has means for electrical connection to inner and outer conductors of a coax cable when that cable is positioned in the inlet, together with electronic circuitry or other means for splitting a CATV signal.

In a wide-band communications network of this kind, the signal strength made available to the individual end subscriber is determined by the attenuation of the splicer/splitter through which the signal is de-coupled from the main circuit. Splicers/splitters with varying attenuation are required due to varying network structures. Thus, for example, the telecommunications authority of the Federal German Post Office uses splicers/splitters in their wide-band communications networks with three different attenuations, namely 10, 15 and 20 dB.

Preference may be made to a device of this type disclosed in DE-40 04 811-Al , which is designed in such a way that the attenuation can be adjusted for any application, and a suitable path can be selected, depending on the attenuation desired. A heat-shrinkable sheath is provided as an external covering for the electronics.

A disadvantage of that device is, however, that suitable electronics must be provided to allow for any desired attenuation. It has also been shown that the technical effort required to provide every individual outlet of the tap with every attenuation value required is very great, and not justifiable from the economic point of view.

An enclosure of the type described above, may have a closure body or housing formed so that it can be opened and tightly closed again, and may have a printed circuit board with a line disconnection for every tap, each mating with a socket, a replaceable modular transfer element being inserted into the socket, provided with corresponding plug connections and having a pre-set selectable attenuation. The closure may comprise a heat-shrinkable or other sleeve.

With such a closure it is possible to connect each tap simply on site at the required attenuation, by opening the closure if necessary, then determining the required attenuation, for example by measuring the main circuit, and then, if necessary, the modular transfer element is replaced by another transfer element to provide the desired attenuation. The closure body may then be closed tightly again. Standard sleeves may be used that can be re-entered to allow the transfer elements to be exchanged in an appropriate manner. In an advantageous refinement of the invention, an individual modular transfer element may be provided for each tap. Such a modular transfer element may have adjustable attenuation and/or other characteristics. Alternatively or additionally, should a tap not be required, an outlet may be bridged by a module comprising a simple wire bridge.

It is particularly advantageous, especially for standard applications, that the components required for several taps are integrated in a modular transfer element, the transfer element having a corresponding multiplicity of plug connections. If, for example, all components for all existing taps are integrated into a modular transfer element, only one module has to be changed in a replacement operation, which is thereby simplified.

In this form, it is preferable that the modular transfer element be provided with integrated internal conductor contacts and plug contacts for the external conductor. In this case, the entire circuit may be constructed as an integrated circuit module and may be inserted into a closure housing on site.

According to the invention, the sleeve body may have connections for the external conductor contacts of the modular transfer element. The electrical connection to outer conductor contacts of incoming and outgoing coax cables may then brought about by metallising appropriate parts of the closure.

To guarantee that the closure can be opened and tightly closed again, it is particularly advantageous for the closure body to comprise a base and a closable cover, with sealing means being provided between the base and the cover, as well as in the area of the cable inlets and cable outlets.

To ensure sealing of the closure against the environment and to ensure high-frequency isolation, it is particularly preferable for the sealing means to be a ring-form combination seal which comprises of a sealing element and a screen element.

It is generally advantageous for the cover to be formed in such a way that any compression force on the sealing element does not exceed the resiliency of the screen element.

For effective sealing of the cable inlets and cable outlets, it is preferable for the sealing means in the area of the cable inlets and cable outlets to take the form of a sealing chamber fully enclosing each cable. Guide units may be provided on the cover for axial and/or radial compression of the sealing means in the cable inlets and cable outlets during installation. When the cover is closed, the guide units may bring about axial and/or radial compression of the sealing elements in the cable inlets and outlets, so that this area is automatically reliably sealed. Preferably the sealing means is mounted in such a way that the material of the screen is protected against corrosion.

The cable inlets and cable outlets are equipped with grippers for resisting axial pull on the cables. Such grippers accepts varying cable diameters, and is provided with cable centring thereby avoiding disturbance of any sealing material which might otherwise occur if the cables were pulled off-center as the grippers are tightened. The grippers are preferably covered when the cover is closed thereby preventing unauthorised tampering.

Contacts for outer conductors of coax cables preferably comprise spring cages which can be adjusted to suit various cable diameters.

Satisfactory closure of the closure, can be facilitated by closure wedges on the base (or cover) which can provide indication to the fitter that a closure has closed properly, and can prevent unintentional opening.

Mast fastening elements may be located on the base and/or cover.

BRIEF DESCRIPTION OF THE DRAWINGS

The invention is further illustrated with reference to the accompanying drawings, in which.

DESCRIPTION OF THE PREFERRED EMBODIMENTS

Figure 1A:
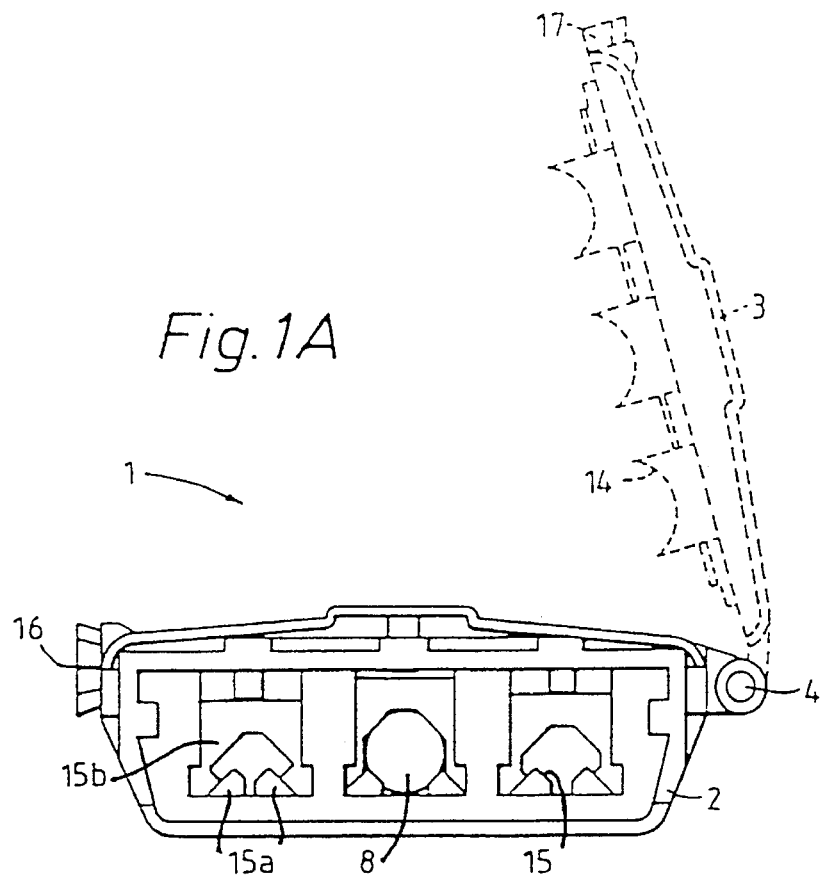
FIGS. 1A and 1B, show side views of an open closure according to invention and a detailed view of a cable gripper.
Figure 1B:
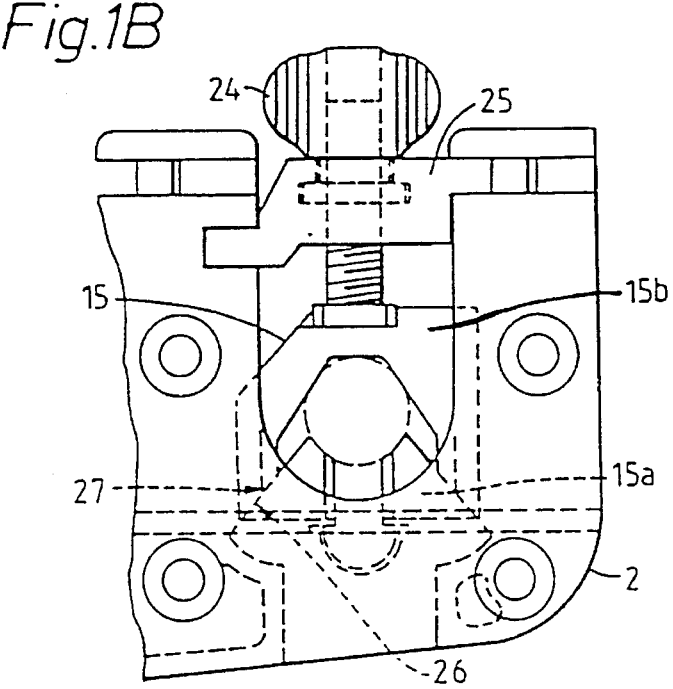
Figure 2:
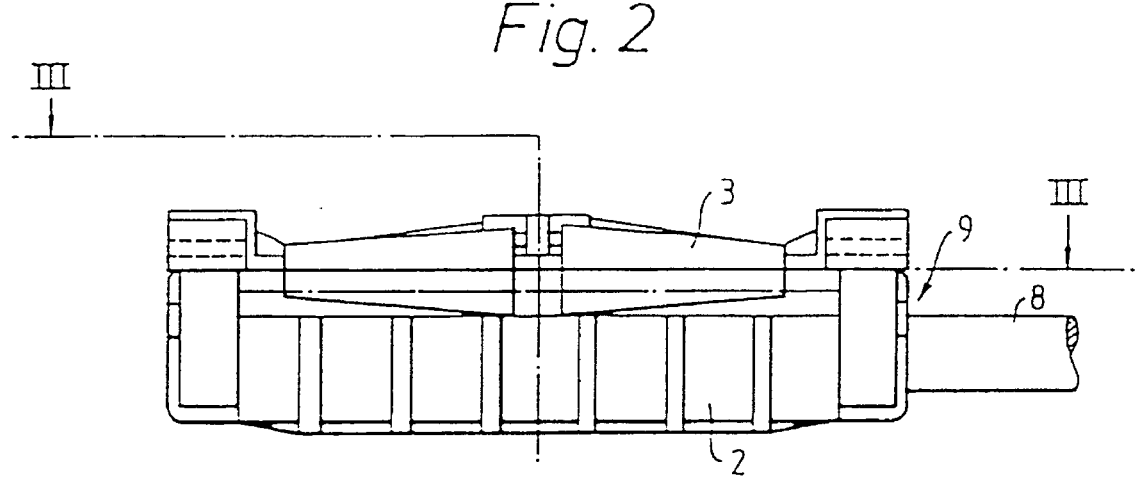
FIG. 2, show a longitudinal side view of a closed closure.
Figure 3:
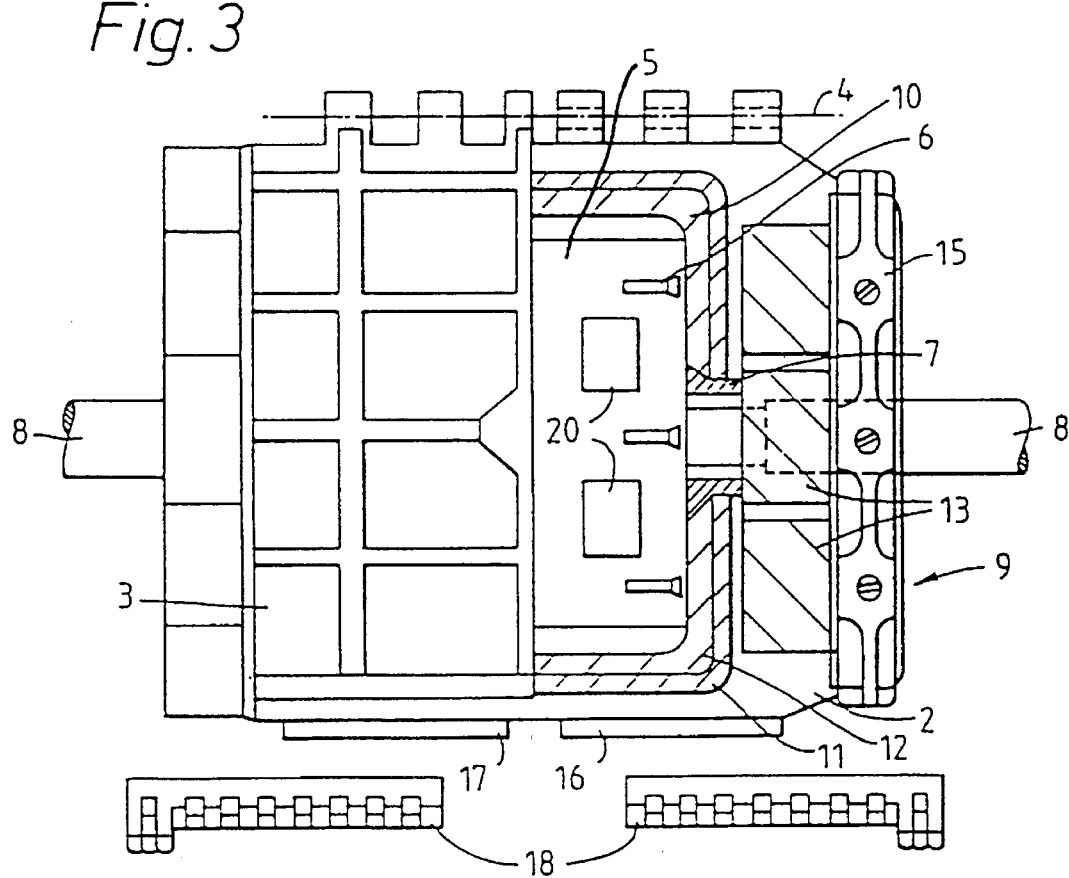
FIG. 3, shows a section along line III—III of FIG. 2, FIG. 4, shows a printed circuit board with modular transfer elements.

A connection and splitter closure according to invention for coaxial cables or the like in a wide-band communications network is indicated by 1 throughout the figures. Here the closure has a base, 2, and a cover, 3, each of which preferably comprises a plastics material. The cover, 3, may be hinged at, 4 to the base, 2, and can thus be opened and shut. The hinge, 4, may allow some translational movement between base and cover at least as they become closed. This allows uniform pressure to be put on a seal extending around the perimeter of the base and/or cover.

The internal surfaces of the components, 2 and 3, are metallised, and a printed circuit board, 5, may be mounted inside the base, 2. This printed circuit board, 5, may be provided with contacts 6 for an inner conductor of a coax cable, 8, and contacts, 7, for an outer conductor. In addition, cable inlets or cable outlets, 9, which are formed in the base, 2, are provided for the coax cables, 8.

For improved sealing of the closure, 1, a gel or mastic strip or other sealing means may be provided which initially serve to bring about sealing between the base, 2, and the cover, 3. Such sealing means may comprise a ring-form combination seal, 10, which may be mounted on the top side of the base, 2, (and/or on the cover) and embrace the entire area of the printed circuit board, 5. The cable inlets or cable outlets, 9, may be sealed by other means. This seal, 10, may consist of a sealing element, 11, and a screen element, 12, which provides high-frequency isolation.

For the sealing at the cable inlets and cable outlets, 9, a sealing chamber, 13, may be provided at each cable inlet or cable outlet port, filled, for example, with sealing gel, and completely enclosing the individual cable. To provide satisfactory sealing at the cable inlets, 9, when the cover, 3, is closed, clamping jaws or other guide units, 14, may be provided on the cover, 3, in order to compress the sealing gel etc axially and/or radially in the sealing chambers, 13.

Each cable inlet (or cable outlet) may have a cable gripper, 15, to provide cable strain relief. The gripper illustrated comprises two (or more) wedge-shaped bottom sections, 15a, which center the cable, and an arc-shaped top section, 15b. Here the two bottom sections, 15a, are biased apart by one or more springs (not shown), in such a way that a cable, 8, can easily be fed between them. To center the cable, 8, and for adjustment to varying diameters, one (or more) upper section, 15b, can be moved down towards the bottom sections, 15a. Each of sections 15a and 15b may have an arc-shaped or other concave surface against which a cable may abut. The three (or more) concave surfaces preferably together approximate to a cylinder of similar diameter to that of a mid-sized cable. The sections 15a and 15b preferably have interacting wedge surfaces or other means such that when the top section, 15b, is moved downwards as drawn, the bottom sections, 15a, move together preferably against the spring bias. In this way, the center of the cylinder referred to above formed from the three or more concave surfaces can remain substantially stationary. Thus, the cable gripper can be tightened around a cable without that cable being displaced, and therefore without any environmental seal around it being disturbed. Activating elements such as crew threads may be provided to move the top section. These elements may be mounted in a cross-piece, 25, which may be fixed or pivotally connected to the body, 2, in such a way that they can be rotated and thus displaced. In this way, the cylinder defined by the sections can be split facilitating entry of a cable, preferably allowing a cable to be inserted transversely. The top section, 15b, can thus be adjusted by turning an individual setting screw, 24. The setting screw, 24, is preferably not accessible when the closure, 1, is closed, so that the gripper cannot be released when the closure, 1, is closed.

So that the closure, 1, can be closed properly and tightly after being opened, wedges, 16 and 17, may be provided on a side of the body, 2, and cover, 3, opposite the hinge, 4, onto which closure clamps, 18, can be pushed. These clamps can preferably be locked in a fully installed position to hold the closure tightly closed. This ensures that the closure, 1, is properly closed and cannot be opened inadvertently.

The sleeve, 1, is preferably re-enterable deliberately, and thus the printed circuit board, 5, may be freely accessible.

Figure 4:
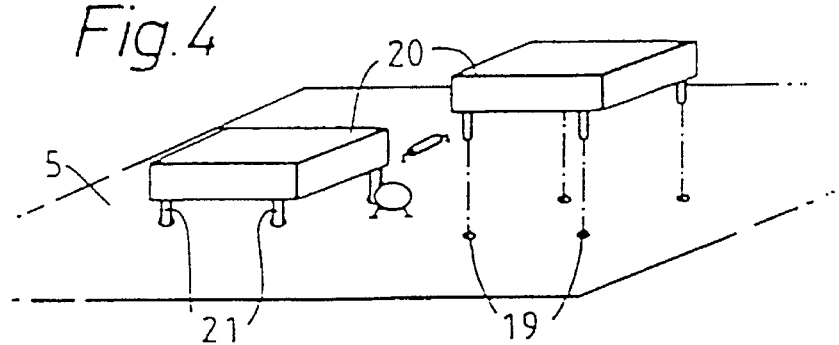

As can best be seen in FIG. 4, the printed circuit board, 5, is provided with connections for each tap, each of which mates with sockets, 19. An interchangeable splitter device, 20, provided with pins, 21, can be plugged into these sockets, 19. Thus a transfer element having a chosen attenuation, e.g. 10, 15 and 20 dB, may be selected for each tap.

An individual modular splitter device, 20, can also be provided for each tap, or, as an alternative, the components required for several taps can be integrated in a modular splitter device, 20 (not shown). Such a transfer element will in general have a correspondingly large number of pins, 21.

The modular splitter device, 20, is preferably equipped with integrated inner conductor contacts and sockets for the outer conductor (not shown in detail).

Figure 5:
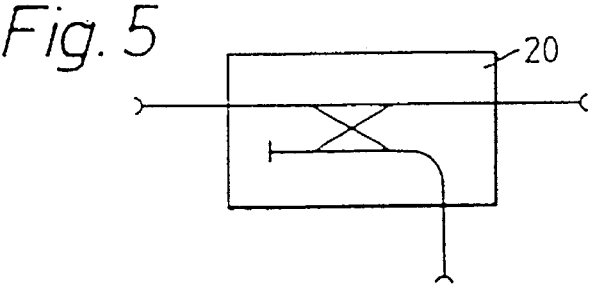
FIGS. 5 to 7, show block diagrams of various modular transfer elements.
Figure 6:
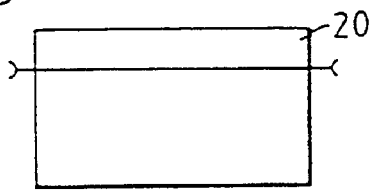
Figure 7:
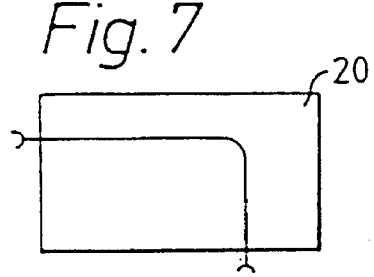

FIG. 5 is a block diagram which shows an example of a splitter device, 20. Other developments are shown in FIGS. 6 and 7, the splitter device, 20, shown there each being equipped with wire bridges for taps not required.

Figure 8:
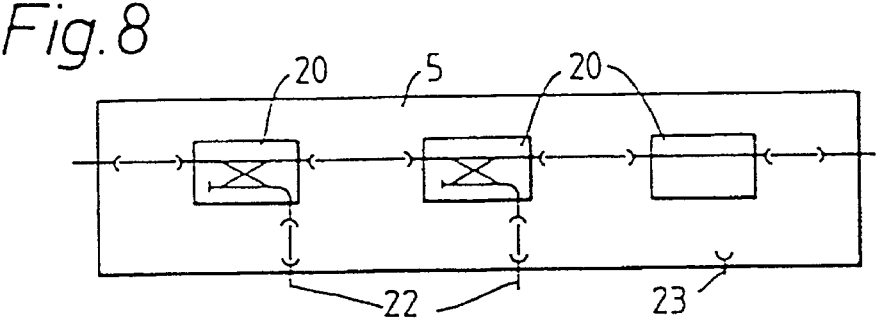
FIG. 8, is a block diagram of a printed circuit board for three taps, two taps being connected to transfer elements and one tap having a transfer element adjacent to it.

FIG. 8 shows a block diagram of a board, 5, for a maximum of three taps, two taps being connected by splitter device. These taps are numbered as 22, whilst the tap numbered as 23 is by-passed by a device, 20, having a mere wire bridge.

The closure according to invention can be used to construct various circuits and taps without changing the printed circuit board, 5, through suitable exchange of devices, 20. This is possible not only when the closure, 1, is first installed, but also on re-entry. In fact, this merely requires the sleeve cover, 2, to be opened and the devices, 20, replaced or repositioned. The closure can then be reclosed.

Naturally, the invention is not restricted to the specific exemplified embodiments illustrated. Further developments of the invention are possible without departing from the basic concept. Thus, the transfer elements, 20, can have a different shape, and suchlike, and the gripper can be used to secure other cables, such as those containing copper pairs or optical fibres, in other types of closure.

We claim:

1. A closure for a cable joint, the closure having a cable inlet which includes a cable gripper that can provide strain relief to a cable having a center line positioned within the inlet, the cable gripper being adjustable to grip cables of different diameters in such a way that the position of the center line of the cable is substantially independent of cable diameter, the cable gripper comprising at least two first sections and at least one second section, the first and second sections each having a cable gripping surface, which surfaces together approximate to a cylinder within which the gripped cable can be received, in which movement of the second section towards the first sections causes the first sections to move towards one another.

2. A closure according to claim 1, in which the cable gripping surfaces are concave.

3. A closure according to claim 1, in which the first sections are resiliently biased apart.

4. A closure according to claim 1, in which the second section may be moved towards and away from the first sections by means of a screw-thread.

5. A closure according to any of claim 1, in which the second section may be pivoted relative to the first sections to split the cylinder.

6. A closure according to claim 1, having a sealing material at the inlet.

7. A closure according to claim 1, having a base and a cover, the cable gripper being provided in the base and the inlet being defined partly in the base and partly in the cover.

8. A closure according to claim 1, having means for electrical connection to tuner and outer conductors of a coax cable when that cable is positioned in the inlet.

9. A closure according to claim 1, having therein means for splitting a CATV signal.

* * * * *